May 4, 1954   J. M. CARTER   2,677,592
PROCESS OF PRODUCING URANIUM TETRACHLORIDE
Filed June 10, 1943
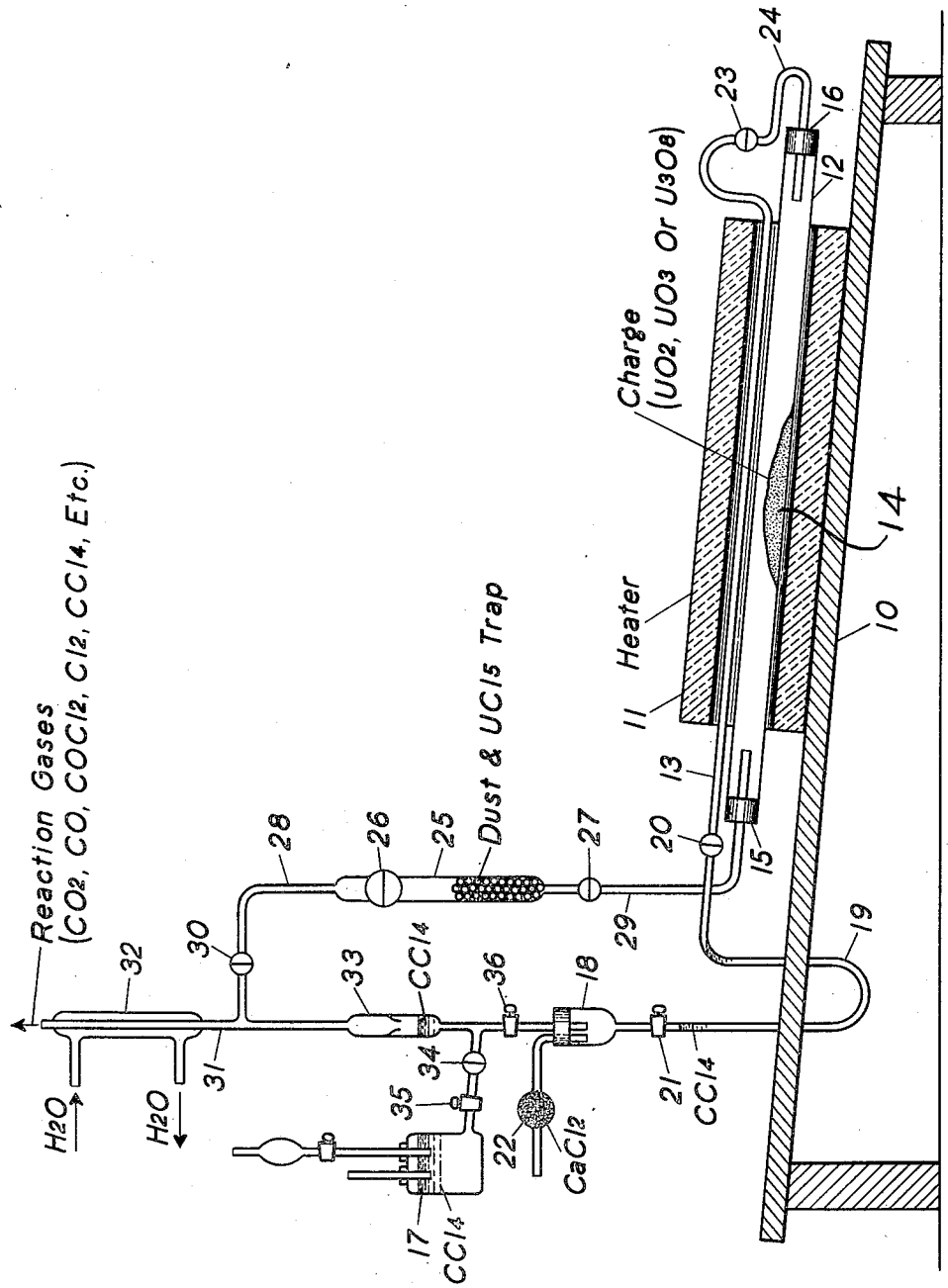
INVENTOR.
James M. Carter
BY
ATTORNEY.

Patented May 4, 1954

2,677,592

UNITED STATES PATENT OFFICE 2,677,592

PROCESS OF PRODUCING URANIUM TETRACHLORIDE

James M. Carter, Berkeley, Calif., assignor to the United States of America as represented by the United States Atomic Energy Commission Application June 10, 1943, Serial No. 490,293

9 Claims. (Cl. 23—14.5)

The present invention relates to processes of producing uranium tetrachloride, and more particularly, to such processes using carbon tetrachloride and the various oxides of uranium.

It is an object of the invention to provide an improved process of producing uranium tetrachloride of high chemical purity in crystalline form, wherein a majority of the product has a relatively large crystalline grain size.

Another object of the invention is to provide an improved carbon tetrachloride and uranium oxide process of producing uranium tetrachloride in which the reaction temperature is maintained within an optimum range, whereby the product is of the desired crystalline structure and side reactions productive of other uranium chlorides and other objectionable compounds are minimized.

Another object of the invention is to provide an improved process of producing uranium tetrachloride which employs reactions of a mixture of carbon tetrachloride vapor and phosgene with an oxide of uranium.

The invention, both as to its organization and method of operation, together with further objects and advantages thereof, will best be understood by reference to the following specification, taken in connection with the accompanying drawing, in which the single figure is a schematic illustration of apparatus suitable for carrying out the processes of the present invention.

In accordance with the present invention, a suitable charge of uranium oxide ($UO_2$, $UO_3$ or $U_3O_8$) is placed in a reaction chamber surrounded by a heater and heated to a reaction temperature, the interior of the reaction chamber near the charge being maintained at a temperature within the range 425° to 475° C., and as near 450° C. as practicable, the pressure meanwhile being substantially atmospheric. Liquid $CCl_4$ is conducted through a conduit arranged adjacent the reaction chamber and surrounded by the heater, whereby $CCl_4$ is converted into the vapor phase and heated to a temperature of the order of 500° C. The hot $CCl_4$ vapor is then conducted into the interior of the reaction chamber into direct contact with the charge of uranium oxide, whereby the hot $CCl_4$ vapor reacts with the hot charge of uranium oxide to produce uranium tetrachloride and certain reaction gases, including $CO$, $CO_2$, $COCl_2$, and $Cl_2$. The reaction gases and the unspent $CCl_4$ vapor are conducted from the reaction chamber through a suitable condenser, whereby substantially all the unspent $CCl_4$ vapor is condensed and the reaction gases are exhausted. Preferably, the condensed $CCl_4$ is again conducted to the conduit for reconversion into the vapor phase, whereby the unreacted $CCl_4$ is recycled repeatedly.

During the process, additional $CCl_4$ is supplied as it is consumed in the reaction with the charge of uranium oxide, and the process is continued until all of the charge of uranium oxide has been converted into $UCl_4$. At this time, when the reaction of the charge of uranium oxide is complete, the evolution of reaction gases ceases, thereby providing a ready indication of the completion of the process. Further, it is noted that the $COCl_2$, produced as a reaction gas is appreciably soluble in $CCl_4$, whereby the charge of uranium oxide is reacted with a mixture of $CCl_4$ vapor and $COCl_2$ after the process is initiated. Thus, the $COCl_2$ also reacts with the charge of uranium oxide to produce $UCl_4$. The fact that $COCl_2$ reacts with the charge of uranium oxide to produce $UCl_4$ is manifest by the consumption of less than two moles of $CCl_4$ to produce one mole of $UCl_4$, as more clearly indicated hereinafter.

Ordinarily, the process requires approximately four and one-half hours to complete the reaction at the reaction temperature mentioned, whereby substantially all of the charge of uranium oxide is converted into $UCl_4$ and appears in crystalline form of dark green color, a majority of the product having a crystalline grain size between 10 and 60 mesh. It is noted that during the course of a run it is well to tap or shake the reaction chamber lightly at suitable time intervals, in order to prevent caking of the product and to cause the unreacted portion of the charge to be presented to the surface to be contacted and reacted.

While the process may be carried out at a reaction temperature below the lower end of the preferred range, at a temperature of 400° C., for example, in order to produce $UCl_4$, this product so produced is in the form of a rather fine greenish colored powder and has a tendency to lump very badly. In addition, the reaction proceeds much more slowly. Similarly, while the process may be carried out at a reaction temperature above the upper end of the preferred range, at a temperature of 500° C., for example, in order to produce $UCl_4$ of the desired crystalline structure, the side reactions productive of other uranium chlorides, such as $UCl_5$, and various other objectionable compounds such as $C_2Cl_6$, from breakdown of $CCl_4$ at this temperature are exceedingly objectionable in that the $UCl_5$ escapes from the apparatus and clogs feed and exit lines; the product may be contaminated with $UCl_5$, $C_2Cl_6$, and other substances, and large amounts of $CCl_4$ are wasted. On the other hand, when the process is carried out at a reaction temperature within the preferred range, substantially complete conversion of the charge is effected, and the product is of a very high chemical purity and of the desired crystalline form, a majority of the product having a crystalline grain size between 10 and 60 mesh. Also in this event, a minimum amount of $CCl_4$ is utilized in the reaction and side reactions productive of other uranium chlorides and other objectionable compounds are minimized. This product so produced, having the desired crystalline structure, is particularly well-suited for use in vacuum apparatus in which it may be vaporized or sublimed in carrying out other processes or methods, in that the product being of relatively large crystalline structure may be readily out-gassed, and has little tendency to be transported as dust in the vacuum apparatus.

After the $UCl_4$ has been produced in accordance with the present process, it is poured from the reaction chamber into a dried container and maintained under a storage atmosphere of $CO_2$. Subsequently, the product is transferred to a dry cabinet containing $CO_2$ and screened, in order to separate out undesirable ends and a minor portion of the product in fine powdered form. More particularly, the useable product is that which will pass a 10-mesh screen and will not pass a 60-mesh screen, a large fraction of the useable product having a crystal grain size between 10 and 30 mesh. The useable product is then bottled in an atmosphere of $CO_2$ or in a vacuum, and sealed for future use in vacuum apparatus.

*Examples*

When the process is carried out employing $UO_2$, 600 grams of $UO_2$ are converted by the required amount of $CCl_4$ to obtain a complete reaction into 844 grams of $UCl_4$; and it is believed that the following specific reactions take place:

$$UO_2 + 2CCl_4 \rightarrow UCl_4 + 2COCl_2$$

$$UO_2 + 2COCl_2 \rightarrow UCl_4 + 2CO_2$$

Both $COCl_2$ and $CO_2$ have been found in the exit gases.

Similarly, when the process is carried out employing $UO_3$, 600 grams of $UO_3$ are converted by the required amount of $CCl_4$ to obtain a complete reaction into 800 grams of $UCl_4$, and it is believed that the following specific reactions take place:

$$UO_3 + 3CCl_4 \rightarrow UCl_4 + 3COCl_2 + Cl_2$$

$$UO_3 + 3COCl_2 \rightarrow UCl_4 + 3CO_2 + Cl_2$$

$COCl_2$, $CO_2$, and $Cl_2$ have been found in the exit gases.

Further, when the process is carried out employing $U_3O_8$, 600 grams of $U_3O_8$ are converted by the required amount of $CCl_4$, to obtain a complete reaction into 812 grams of $UCl_4$; and it is believed that the following specific reactions take place:

$$U_3O_8 + 8CCl_4 \rightarrow 3UCl_4 + 8COCl_2 + 2Cl_2$$

$$U_3O_8 + 8COCl_2 \rightarrow 3UCl_4 + 8CO_2 + 2Cl_2$$

$COCl_2$, $CO_2$, and $Cl_2$ have been found in the exit gases.

In carrying out the present process, utilizing a charge of $UO_2$, a typical run is productive of $UCl_4$ having a crystalline structure of the desired grain size as indicated below:

| | Grams | Fract. | Percent $UCl_4$ [1] | Ratio Cl/U |
|---|---|---|---|---|
| Ends, not screened | 35 | 0.04 | | |
| Main product: | | | | |
| over 10 mesh | 82 | 0.10 | | |
| 10-30 mesh | 386 | 0.47 | 97.5 | 3.94 |
| 30-60 mesh | 160 | 0.19 | 98.7 | 3.94 |
| Below 60 mesh | 148 | 0.18 | | |
| Screening loss | 16 | 0.02 | | |
| Totals | 827 | 1.00 | | |

[1] Based on Cl analysis.

Referring now more particularly to the single figure of the drawing, there is illustrated suitable apparatus for carrying out the present process, which comprises an inclined support 10 carrying a hollow tubular heater 11 of any desired type. Arranged within the opening in the heater 11 are a tubular Pyrex reaction chamber 12 and a glass conduit 13, the conduit 13 being disposed adjacent the reaction chamber 12 and in slightly closer proximity to the wall of the heater 11. The reaction chamber 12 contains a suitable charge 14 of uranium oxide and the opposite ends thereof are closed by suitable removable stoppers 15 and 16. Also, the apparatus comprises a reservoir 17 of the constant head-feed type, and containing $CCl_4$, a connected feed-drop counter 18, and a connected substantially U-shaped liquid seal 19. One end of the liquid seal 19 is connected by a suitable ground glass joint 20 to one end of the conduit 13; and a suitable surge damper stop-cock 21 is interposed between the other end of the liquid seal 19 and the feed-drop counter 18. Also, the feed-drop counter 18 communicates with the atmosphere through a tube 22 containing a packing of a suitable drying agent such, for example, as $CaCl_2$. The other end of the conduit 13 is connected by a ground glass joint 23 to a tube 24 extending through the stopper 16 into the interior of the reaction chamber 12.

Further, the apparatus comprises a dust and $UCl_5$ trap 25 connected by ground glass joints 26 and 27 to two tubes 28 and 29, respectively, the tube 28 being connected by a ground glass joint 30 to an upstanding tube 31, and the tube 29 extending through the stopper 15 into the interior of the reaction chamber 12. The upper end of the upstanding tube 31 is surrounded by a suitable condenser 32, through which a suitable cooling liquid such, for example, as water, is conducted; and the lower end of the upstanding tube 31 terminates in a return drop counter 33. The lower end of the return drop counter 33 is connected by way of a ground glass joint 34 and a stop-cock 35 to the reservoir 17. Also, the reservoir 17 and the lower end of the return drop counter 33 are connected by way of a surge damper stop-cock 36 to the feed-drop counter 18.

Considering now the operation of the apparatus, liquid $CCl_4$ is conducted from the feed-drop counter 18 by way of the surge damper stop-cock 21 into the liquid seal 19, the surge damper stop-cock 21 being adjusted to prevent surge of liquid $CCl_4$ back into the feed-drop counter 18. From the liquid seal 19 the liquid $CCl_4$ flows downwardly into the inclined conduit 13, where it is converted into the vapor phase and passed via the tube 24 into the interior of the reaction chamber 12 into contact with the hot charge 14. A portion of the charge 14 of uranium oxide is converted into $UCl_4$, and certain reaction gases are produced, as previously noted. The unspent $CCl_4$ vapor and the reaction gases are then swept from the reaction chamber 12 through the tube 29 into the dust trap 25, and flow therefrom through the tube 28 into the upstanding tube 31. All of the reaction gases insoluble in $CCl_4$ pass through the upper end of the upstanding tube 31 and are exhausted, while $CCl_4$ vapor entering the upper end of the upstanding tube 31 is condensed by the condenser 32 and flows downwardly into the return drop counter 33. The condensed $CCl_4$ flows from the return drop counter 33 again into the feed drop counter 18, and is repeatedly recirculated. The $CCl_4$ which is reacted is made up for by additional $CCl_4$ introduced into the circulating system from the reservoir 17, the additional $CCl_4$ mentioned flowing via the stopcock 35 and the surge damper stop-cock 36 with the condensed $CCl_4$ from the return drop counter 33 into the feed drop counter 18. The stop-cock 35 is adjusted so that the supply of $CCl_4$ from the reservoir 17 and the return drop counter 33 into the liquid seal 19 is appropriate to supply the necessary $CCl_4$ into the conduit 13 and to prevent flooding of liquid $CCl_4$ through the conduit 13 into the reaction chamber 12. As previously noted, a portion of the $COCl_2$ produced as a reaction gas in the reaction chamber 12 is dissolved in the $CCl_4$ and is circulated in the system with the $CCl_4$, whereby the charge 14 of uranium oxide is reacted by the mixture of $CCl_4$ vapor and $COCl_2$.

It will be understood that the time of four and one-half hours mentioned as being suitable for carrying out a complete reaction refers only to the specific examples given utilizing a charge of a fixed number of grams of uranium oxide in a reaction chamber of specified size and shape. By using a smaller amount of uranium oxide and/or increasing the proportionate surface of the charge exposed to the action of the vapors, the time required for a complete reaction of the charge may be considerably reduced. For example, charges of 5 to 20 grams of $UO_2$ have been substantially completely converted (98+%) to $UCl_4$ in 10 to 20 minutes.

It is pointed out that the oxide of uranium preferred as a charge in this reaction is $UO_2$, in that it has several advantages over the other oxides mentioned. In the first place, a charge of $UO_2$ reacts much more rapidly than a charge of either $U_3O_8$ or $UO_3$, a charge of $UO_3$ reacting most slowly of the three uranium oxides mentioned. Also, in $UO_2$ the uranium is already in the same valence state as it is in the product $UCl_4$; no chlorine is produced in the reaction; and there is accordingly less tendency to form $UCl_5$ and other objectionable compounds. Finally, as a corollary of the fact that a charge of $UO_2$ is most rapidly converted, this more rapid reaction is advantageous in avoiding the formation of $UCl_5$ and other objectionable compounds, as the reaction temperature can be kept toward the lower end of the preferred range.

While there has been described what is at present considered to be the preferred embodiment of the process, it will be understood that various modifications may be made therein and it is intended to cover in the appended claims all such modifications as fall within the true spirit and scope of the invention.

What is claimed is:

1. The process comprising reacting carbon tetrachloride vapor with an oxide of uranium at a reaction temperature within the range 425° to 475° C., and maintaining the temperature within said range until the oxide is substantially completely converted to crystalline uranium tetrachloride, the major portion of the product having a crystal grain size between 10 and 60 mesh.

2. The process comprising contacting carbon tetrachloride vapor with an oxide of uranium at a reaction temperature within the range 425° to 475° C., whereby uranium tetrachloride and reaction gases including phosgene are produced, condensing the unreacted carbon tetrachloride vapor, whereby carbon tetrachloride is separated thereby dissolving some of the phosgene from the remainder of the reaction gases, and reconverting the liquid carbon tetrachloride and dissolved phosgene into vapor to be contacted again with the unreacted oxide of uranium, whereby the unreacted carbon tetrachloride and some of the phosgene are recycled repeatedly and maintaining the temperature within said range until the oxide is substantially completely converted to crystalline uranium tetrachloride, the major portion of the product having a crystalline size between 10 and 60 mesh.

3. The process comprising reacting $CCl_4$ vapor with $UO_2$ at a reaction temperature within the range 425° to 475° C., and maintaining the temperature within said range until the oxide is substantially completely converted to crystalline $UCl_4$, the major portion of the product having a crystal grain size between 10 and 60 mesh.

4. The process comprising reacting $CCl_4$ vapor with $UO_3$ at a reaction temperature within the range 425° to 475° C., and maintaining the temperature within said range until the oxide is substantially completely converted to crystalline $UCl_4$, the major portion of the product having a crystal grain size between 10 and 60 mesh.

5. The process comprising reacting $CCl_4$ vapor with $U_3O_8$ at a reaction temperature within the range 425° to 475° C., and maintaining the temperature within said range until the oxide is substantially completely converted to crystalline $UCl_4$, the major portion of the product having a crystal grain size between 10 and 60 mesh.

6. The process comprising reacting a mixture of carbon tetrachloride vapor and phosgene with an oxide of uranium at a reaction temperature within the range 425° to 475° C., and maintaining the temperature within said range until the oxide is substantially completely converted to crystalline uranium tetrachloride, the major portion of the product having a crystal grain size between 10 and 60 mesh.

7. The process comprising reacting a mixture of $CCl_4$ vapor and $COCl_2$ with $UO_2$ at a reaction temperature within the range 425° to 475° C., and maintaining the temperature within said range until the oxide is substantially completely converted to crystalline $UCl_4$, the major portion of the product having a crystal grain size between 10 and 60 mesh.

8. The process comprising reacting carbon tetrachloride vapor with an oxide of uranium selected from the group consisting of $UO_2$, $UO_3$ and $U_3O_8$ at a reaction temperature within the range 425° to 475° C., and maintaining the temperature within said range until the oxide is substantially completely converted to crystalline uranium tetrachloride, a major portion of the product having a crystal grain size between 10 and 60 mesh.

9. The process comprising reacting carbon tetrachloride vapor with an oxide of uranium at a reaction temperature of approximately 450° C., and maintaining said temperature until the oxide is substantially completely converted to crystalline uranium tetrachloride, the major portion of the product having a crystal grain size between 10 and 60 mesh.

References Cited in the file of this patent

UNITED STATES PATENTS

| Number | Name | Date |
| --- | --- | --- |
| 2,150,366 | Ehrhart | Mar. 14, 1939 |
| 2,178,685 | Gage | Nov. 7, 1939 |

OTHER REFERENCES

Mellor, "Comprehensive Treatise on Inorganic and Theoretical Chemistry," vol. XII, pages 80 and 81. (Copy in Division 59.)

Chem. Abstracts 5 1036. (Copy in Division 6.)